Dec. 1, 1931.   C. C. LOOMIS   1,834,410

FIREARM

Filed Jan. 31, 1929     5 Sheets-Sheet 1

INVENTOR
CRAWFORD C. LOOMIS
BY
ATTORNEYS

Dec. 1, 1931.  C. C. LOOMIS  1,834,410
FIREARM
Filed Jan. 31, 1929  5 Sheets-Sheet 5

INVENTOR
CRAWFORD C. LOOMIS
BY
ATTORNEYS

UNITED STATES PATENT OFFICE

CRAWFORD C. LOOMIS, OF ILION, NEW YORK, ASSIGNOR TO REMINGTON ARMS COMPANY, INC., A CORPORATION OF DELAWARE

FIREARM

Application filed January 31, 1929. Serial No. 336,457.

The present invention relates to firearms of the general type wherein a receiver housing the firing mechanism is provided with a magazine tube in which are stored cartridges adapted one at a time to be snapped into the receiver to a position on a carrier for elevation to a position opposite the breech in a barrel which is mounted on the end of the receiver adjacent the magazine tube, the cartridges being then in a position for advancement into the breech by forward movement of a reciprocating breech block. Reciprocation of the breech block is accomplished by forward and rearward movement of a slide carrying the breech block, said slide being reciprocated by manual movement of a forearm slidably mounted on the magazine tube and connected by an action bar to the slide.

The firearm of the present invention is of the side ejection type, wherein the fired shell is engaged by members on the breech block and retracted to a position in the receiver where it engages an ejector device and is ejected through a port hole in the side of the receiver. In these general respects the firearm of the present invention is similar to that of my copending application, Serial No. 197,118, filed June 7, 1927, (now Patent No. 1,763,714, June 17, 1930), but several novel changes in construction are embodied in the firearm of the present invention, as will be fully described hereinafter.

In my copending application, Serial No. 135,582, filed September 15, 1926, I have disclosed a firearm embodying numerous safety devices automatically operable to prevent release of the firing mechanism in all positions of the breech block other than the fully closed position of the block. An action slide locking member is provided to lock the slide and breech block in the breech-closed or firing position. In the prior application a spring wire is carried by the slide locking member, which wire is adapted to be engaged by a hammer spring strut to depress the slide locking member on release of the hammer. It is an object of the present invention in a firearm of the type described to effect this latter function of depressing the sear lock by a novel and simple construction, wherein a spring wire is carried by the hammer spring follower and is actuated thereby and connected to the slide lock to urge the latter to slide engaging position or depressed position, accordingly as the hammer spring is in the retracted position or fired position.

In said Patent No. 1,763,714, there is disclosed a means for urging the carrier to its lowermost position consisting of a spring bearing against one of the carrier arms. It is another object of the present invention to provide an improved cam means for positively moving the carrier to the lowermost position.

A further object of the present invention is to provide in a gun of the side ejection type an improved mounting for the shell ejector member.

A further object of the present invention is to provide a firearm in which a barrel may be readily attached and detached from the receiver, and in which is embodied a new and improved take-down mechanism for detachably securing the barrel to the magazine tube.

A further object of the present invention is to provide at the forward end of the receiver a new and improved means for attaching the barrel and magazine tube to the receiver.

A further object of the present invention is to provide the ends of the hammer pivot pin with lugs for guiding and stabilizing the trigger plate in the receiver, and to utilize these lugs also to facilitate removal of the hammer pivot pin.

A further object of the present invention is to provide an improved firearm wherein the parts and mechanism housed within the receiver may be easily removed therefrom manually, without the aid of tools, and without the necessity of taking down the stock of the firearm.

With these and other objects in view the invention consists in the novel combinations and arrangements of parts as illustrated by the preferred embodiment described in the following specification and shown in the accompanying drawings.

*Take-down mechanism*

Figure 3:
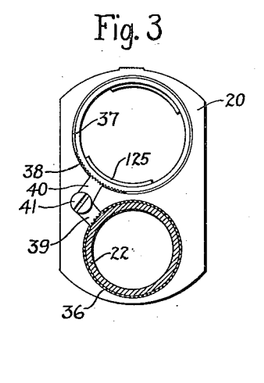
Fig. 3 is a transverse section of the firearm taken along the line 3—3 of Fig. 1.
Figures 11, 12, 13:
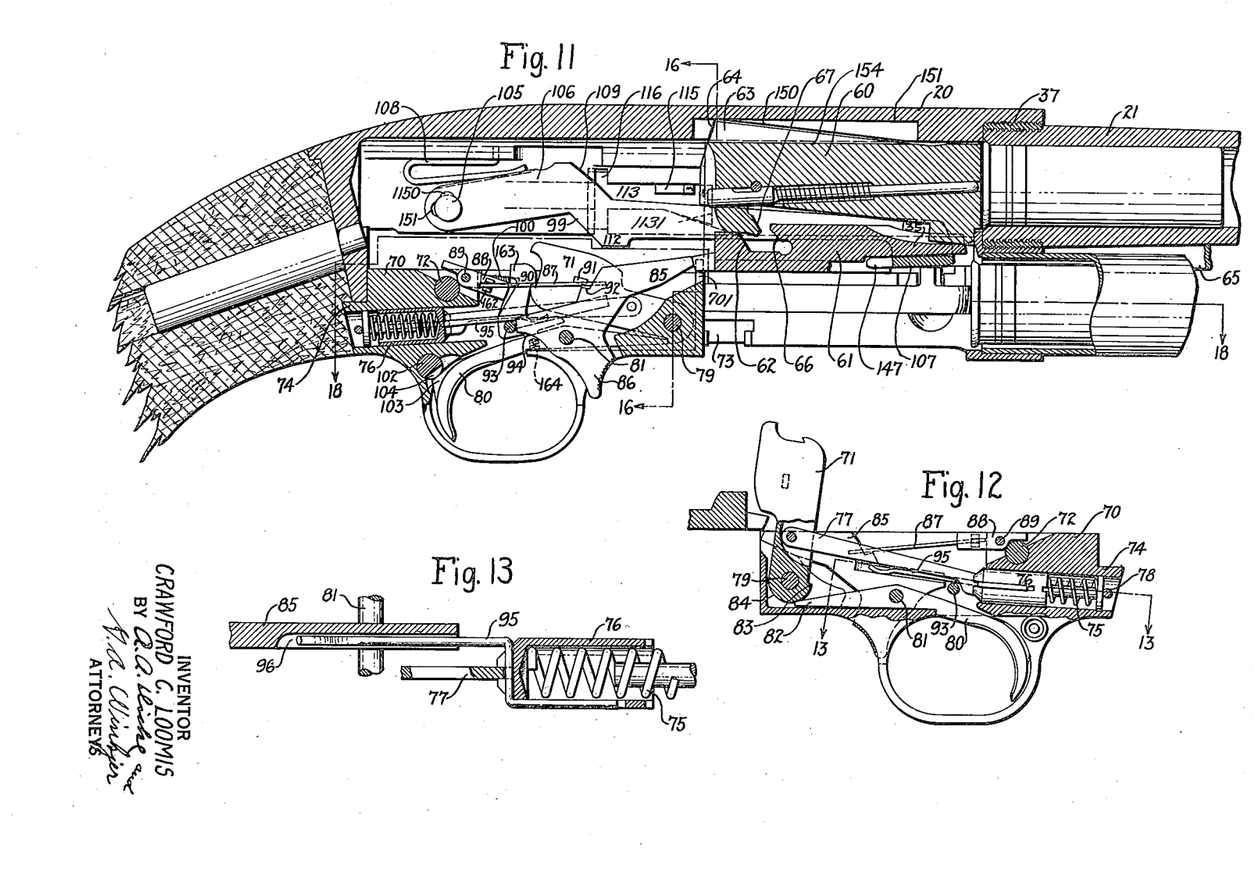
Fig. 11 is a fragmentary longitudinal section in elevation showing the arrangement of parts within the receiver.
Fig. 12 is a sectional view of the trigger plate unit taken along the line 12—12 of Fig. 18.
Fig. 13 is a sectional detail view of certain parts as viewed from above. This section is taken along the line 13—13 of Fig. 12.

A barrel 21 is detachably secured to the forward portion of a receiver 20 by the novel construction shown in Figs. 3 and 11. A bushing 37 is threaded into an opening in the forward portion of the receiver 20. The interior of the bushing is provided with mutilated threads 125 engageable with complementary mutilated threads on the rear portion of the barrel, engagement being effected by inserting the rear end of the barrel in the bushing and then rotating the barrel through 90° to engage the threads. In Fig. 3 is shown an improved means for securing the bushing 37 and the magazine tube to the receiver. Serrations 36 and 38 are formed in the outer surface of the magazine tube 22 and on the outer rear surface of the bushing 37, respectively, these serrations being engaged by similar serrations on each of two key plates 39 and 40 which are positioned in cuts in the surface of the receiver. A set screw 41 clamps both of the key plates in place, thus effecting the attachment of bushing 37 and magazine tube to the receiver by the use of a single screw.

Figure 1:
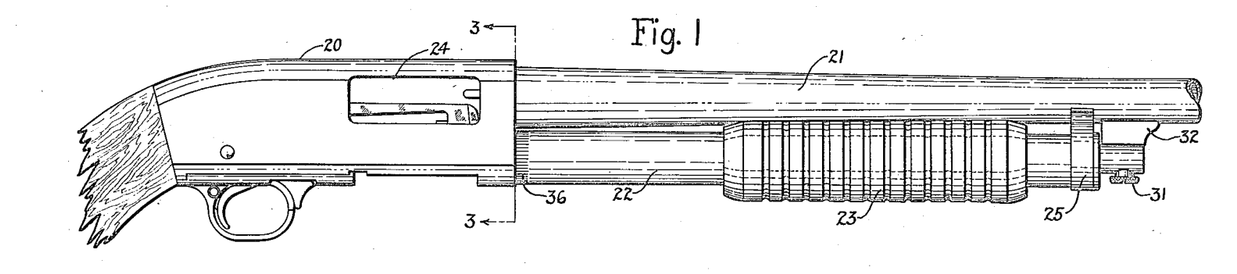
Fig. 1 is a view in side elevation of the right hand side of my improved firearm.
Figure 2:
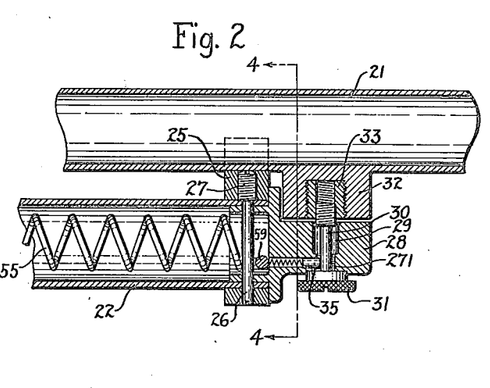
Fig. 2 is a longitudinal section in elevation of the forward portion of the magazine and a portion of the barrel, showing in detail an improved form of take-down mechanism.
Figure 4:
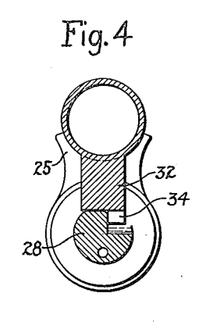
Fig. 4 is a transverse section taken along the line 4—4 of Fig. 2.

The barrel is detachably mounted at the forward end of the magazine tube by an improved take-down mechanism now to be described. Fig. 2 shows an embodiment of such a take-down mechanism. In this figure, member 25 is a barrel yoke encircling the tube 22 and formed concave at its upper side as a cradle support for the barrel. This yoke is detachably secured to the forward end of the magazine by assembly pin 26, which is inserted from above, through apertures in the yoke and magazine tube, and is threaded into the yoke as at 27. The assembly pin, passing through aligned apertures, also retains a plug 28 in a position closing the end of the magazine tube. The assembly pin 26 serves also as a forward bearing for magazine spring 55. The plug 28 is provided with a vertically disposed aperture having an upper countersunk portion 29 for the reception of a retaining screw 30, and a lower threaded portion 271 provided for removal of the retaining screw. Accidental removal and loss of the retaining screw is prevented by locking the screw in the plug, which locking is effected by a spring pressed follower 35 sliding in a longitudinal guide channel in the plug, and being urged against the shank of the retaining screw. In order to remove the retaining screw it is necessary to first remove transverse pin 59 against which the follower spring bears. A lug 32, integral with the barrel, is formed with a threaded socket to receive bushing 33 which is threaded interiorly and exteriorly. A projection 34 on the barrel lug (Fig. 4), engaging the side of a notch in the plug 28, limits the rotation of the barrel. To mount the barrel, the rear end is first inserted in the receiver bushing with the lug 32 extending 90° to the right (Fig. 4). The barrel is then given a quarter turn clockwise to bring projection 34 against its seat on plug 28, and to engage the mutilated threads in the barrel bushing. The threaded portion of retaining screw 30 may then be engaged with the threads on the interior of bushing 33 by manipulating the knurled head 31 to securely attach the barrel to the magazine tube. The barrel may be taken down by a reversal of the above procedure.

Figure 5:
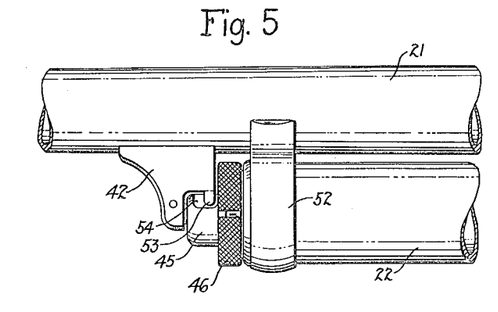
Fig. 5 is a fragmentary side elevation showing a modified form of take-down mechanism.
Figure 6:
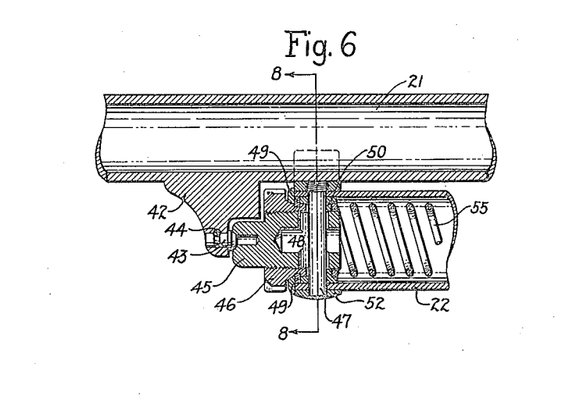
Fig. 6 is a longitudinal section in elevation of the modification shown in Fig. 5.
Figure 7:
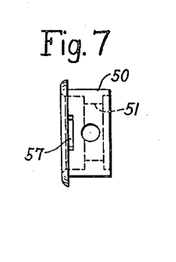
Fig. 7 is a detail in plan of one of the elements of the take-down mechanism.
Figure 8:
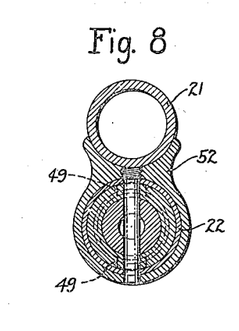
Fig. 8 is a transverse section of a portion of the firearm taken at a point as indicated by the line 8—8 of Fig. 6.

In Figs. 5 to 8 is shown a modified construction for a take-down mechanism. In this modification, the barrel is provided with a lug 42 which is apertured at its lower end to receive a bevel-headed stud 43 which is retained in place by a transverse pin 44. A plug 45, provided at its forward end with a bevel edge socket, is movable longitudinally to engage the head of stud 43 in the socket for attaching the barrel to the magazine tube. Movement of the plug is controlled by rotation of knurled nut 46 which threadedly engages a portion of the outer surface of the plug. The plug is permited to move longitudinally, but rotative movement is prevented by assembly pin 47 which passes through an elongated aperture 48 vertically disposed in the plug. Knurled nut 46 is permitted to rotate, but is held from longitudinal movement by the engagement of key members 49 in a circumferential groove at the rear portion of the nut, as shown in Fig. 6. These key members are also indicated by dotted lines in Fig. 8. The key members are retained in slots 57 formed in an annular sleeve-like member 50 (Fig. 7), which is flanged at its forward portion and is positioned in the forward end of the magazine tube, the flange engaging the end of the tube. The key members are restrained from outward movement by their engagement with the inner wall of the magazine tube. The sleeve member 50 is recessed on its inner side as shown by the dotted lines 51 in Fig. 7, a seat being provided at the rear portion to serve as an abutment for magazine spring 55, and a recess in the forward portion for the reception of the rear end of the nut 46. A barrel supporting yoke 52 is mounted on the outside of the magazine tube, and the assembly pin 47, inserted from above and passing through apertures in the yoke, magazine tube and sleeve member 50, securely holds the parts in their assembled positions, the assembly pin being screwed into a threaded portion in the upper part of the yoke.

The barrel is mounted by inserting the rear end in the breech and rotating to engage the mutilated threads, as described for the construction shown in Fig. 2, a projection 53 on the barrel lug serving to limit the rotation of the barrel by engagement with the side of notch 54 formed in the plug 45 (Fig. 5). Rotation of knurled nut 46 will then advance the plug 45 forward into engagement with stud 43, the beveled head on the stud and its seat in the plug 45 affording a tight clamping action to take place to secure the barrel to the magazine tube. Taking down the barrel may be effected by a reversal of the above procedure.

Figure 9:
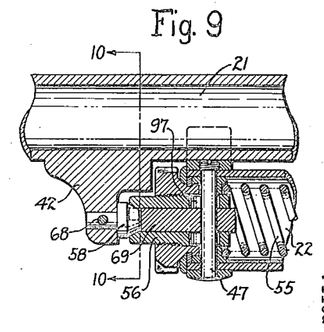
Fig. 9 is a fragmentary longitudinal section in elevation illustrating a still further modified form of take-down mechanism.
Figure 10:
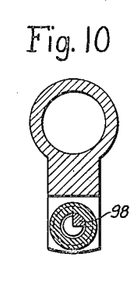
Fig. 10 is a transverse section taken at line 10—10 of Fig. 9.

In the modification of Figs. 9 and 10 a take-down mechanism is illustrated which is similar to the construction shown in Fig. 6, but which embodies several differences in structure. In this construction, the travelling plug of Fig. 6 is replaced by a travelling sleeve 56 having a beveled seat at its forward end for engagement with a bevel-headed stud 58 which is mounted in barrel lug 42 and secured by transverse pin 68. The sleeve 56 travels upon and is supported by plug 69 which is held from longitudinal and rotative movement by the assembly pin 47 passing through a vertical aperture in the plug. Elongated recess 97 permits longitudinal movement of sleeve 56 but prevents rotative movement of the same. Rotative movement of the barrel in mounting is limited by the seating of projection 98, formed integral with the plug 69, against the side of a recess in the head of stud 58, as shown in Figs. 9 and 10. The remaining structure is similar to that described for the mechanism of Fig. 6, and the procedure for mounting and taking down the barrel is the same.

*Firing mechanism*

In Fig. 11 there is shown a view of the interior of the receiver disclosing the parts in ready-to-fire position. A reciprocating breech-block 60 is at its foremost position. On a slide 61 is provided a cam surface 62 which, in the position of the parts as shown, cams the breech-block upward so that projection 63 engages recoil shoulder 64 cut into the upper wall of the receiver. Retraction of the slide 61 by operation of the forearm 23 and action bar 65 causes cam surface 66 on slide 61 to engage surface 67 on the breech-block to cam the latter downward out of engagement with recoil shoulder 64. Further rearward movement of slide 61 causes retraction of breech-block 60, the slide 61 supporting and carrying the breech-block in its rearward movement. On moving the forearm 23 and slide 61 forward again it will be seen that as the slide nears its forward position the camming action of surface 62 against the breech-block will again raise the latter to engaging position with recoil shoulder 64.

Figure 15:
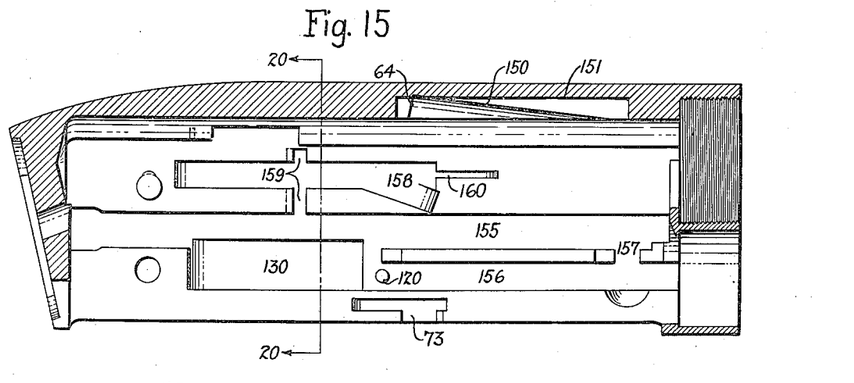
Fig. 15 is a longitudinal section of the receiver showing the arrangement of the several recesses cut in the inner wall on the left hand side of said receiver.
Figures 16, 17, 22:
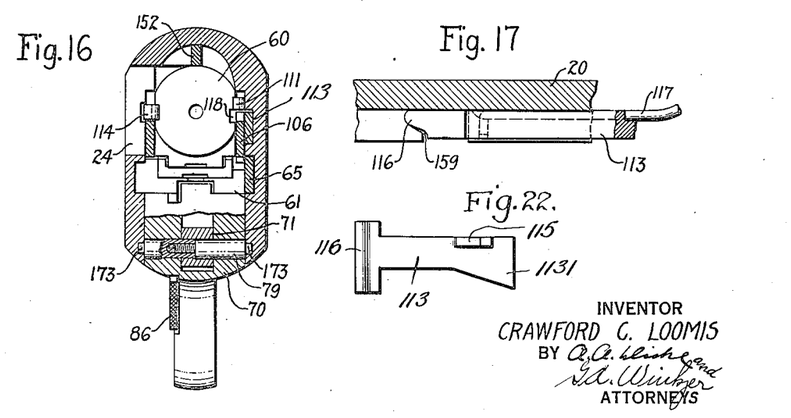
Fig. 16 is a transverse section looking to the rear, taken through the receiver along the line 16—16 of Fig. 11. In this view the breech block and slide are seen to be at their rearward positions.
Fig. 17 is a plan detail, partially in section, of the improved ejector mounting in the receiver wall.
Fig. 22 is a detail of the ejector.

As seen in Figs. 11 and 12, a trigger plate unit 70 houses the hammer 71 and its controlling mechanism. This trigger plate unit 70 is readily detachable from the receiver after the removal of a transverse retaining pin 72 from coinciding apertures extending through the receiver and trigger plate unit. Slot 161 (Fig. 18) is provided in the trigger plate to house a wire bow spring or other resilient means for engaging a groove in the pin 72 to yieldingly hold the pin in place, allowing manual removal of the pin by pressure from one end in a manner well known in the art. The trigger plate unit is properly guided in the receiver on assembly and disassembly by the engagement of lugs 173 with L-shaped slots 73 formed in the sides of the receiver wall (Figs. 15 and 16). These lugs 173 project outwardly from the trigger plate, are rectangular in cross-section and are integral with the hammer pivot pin 79. As seen in Fig. 16 the hammer pivot pin 79 comprises the novel construction of two parts which telescopically and threadedly engage each other, affording a ready separation and removal of the parts of the pin 79 by manipulation of lugs 173. Detachment of the trigger plate unit from the receiver is effected after removal of pin 72, above explained, by merely sliding the trigger plate forward and then down to disengage lugs 173 from slots 73 and to remove the rearwardly projecting portion 74 from its recess in the receiver (Fig. 11).

Referring now to Fig. 12, the hammer 71 is actuated by hammer spring 75 through the medium of spring follower 76 and hammer spring strut 77. The hammer spring is seen to bear at its rear end against a washer held by retaining pin 78. The trigger 80 is mounted on pivot 81 and has a forwardly projecting nose portion 82 which is adapted to engage notch 83 of the hammer 71 when the latter is in cocked position. In every position of the hammer, other than cocked position, it will be seen that curved surface 84 of the hammer, having pivot 79 as a center, will hold the nose portion 82 of the trigger in depressed position. An action slide lock 85 is also mounted on the trigger pivot pin 81.

In the position shown in Fig. 11 it will be seen that a forwardly extending portion of the action slide lock engages the rear portion of the slide, thus firmly locking it in position. On depressing the finger piece 86 the forward portion of slide lock 85 will be released from engagement with the action slide to permit retraction of the latter. In so doing, however, a spring wire 87 rigidly secured at one end in slide lock 85 will be put under upward tension to bear in its seat in a slotted lug 162 rigid with a sear lock 88 to move lock 88 upwardly about its pivot 89 to engage projection 163 on hammer engaging sear 90. Thus, in Fig. 11, the hammer will be locked in cocked position by sear 90 and lock 88 if action slide lock 85 be depressed. With action slide lock 85 depressed, slide 61 may be rearwardly retracted and in so doing the slide will pass over the forward portion of the action slide lock 85 and thus hold the latter down. In the rearmost position of the slide, the forward portion of the slide lock will not be depressed however, and to insure that the hammer will be locked in this position of the slide, lug 91 is mounted at one side of hammer 71 to engage shoulder 92 of the slide lock to depress the latter when the hammer is in the lowermost position. By so depressing the slide lock the sear lock 88 will be raised, as before, to lock the sear 90 in hammer engaging position. The slide lock 85 and the sear lock 88 rotate oppositely but in coordination, the sear lock 88 tending to move upward when the slide lock is depressed, and to be lowered when the slide lock is in slide-engaging position.

When the trigger is depressed in firing, referring to Figs. 11 and 12, the sear 90 will be released from hammer engaging position by movement around its pivot 93 caused by lifting of trigger 80 against the foot portion 94 of the sear. In this fired position, the slide lock 85 is brought to a disengaged position by a means shortly to be described, and this depression of slide lock 85 through spring wire 87 will urge sear lock 88 upwardly as above explained. However, the sear 90 is now in a retracted position, having been moved to hammer-disengaging position by pressure on sear foot 94 from the trigger, the trigger being now held depressed by the contact of cam surface 84 of the hammer on trigger nose portion 82. The sear lock cannot now engage the rear side of projection 163 to lock the sear, but must bear against the under surface of the projection until the hammer is again drawn back to cocked position to release the trigger nose from its depressed position. Cocking of the hammer allows the nose of the trigger to enter the notch 83, which action will permit the sear to return to cocking position and allow the lock 88 to rise to sear locking position.

As before mentioned, in order to move slide 61 rearward it is necessary to disengage lock 85 from the slide. This is done automatically on firing by movement of the hammer spring follower 76. Movement of this follower forward causes a forward movement of a wire spring 95 which as shown in Fig. 13 is angularly bent to be held in a slot in the follower by pressure from strut 77 notched at its rear end to bear against spring wire 95. At its forward end said spring 95 is slightly bent and rides in and presses against the bottom of a groove 96 in the action slide lock 85. In Fig. 11 it will be seen that the forward portion of wire spring 95 bears against the slide lock 85 to the rear of pivot 81. In Fig. 12, however, wherein hammer 71 is in released or fired position, the said spring 95 presses against the slide lock 85 forward of pivot 81. Thus, in the act of firing, because of the shifting of pressure of spring 95 from one side of pivot 81 to the other, slide lock 85 is caused to be depressed and disengaged from slide 61, allowing retraction of the slide for a reloading and recocking operation.

A trigger safety 102 is provided to slide laterally in an aperture in the trigger guard to prevent the depression of the trigger when so desired. Depression of the trigger is normally allowed by the entrance of projection 103 of the trigger into slot 104 of the safety. Lateral movement of the safety presents an obstructing surface to the projection 103, thus locking the trigger against movement.

Figure 18:
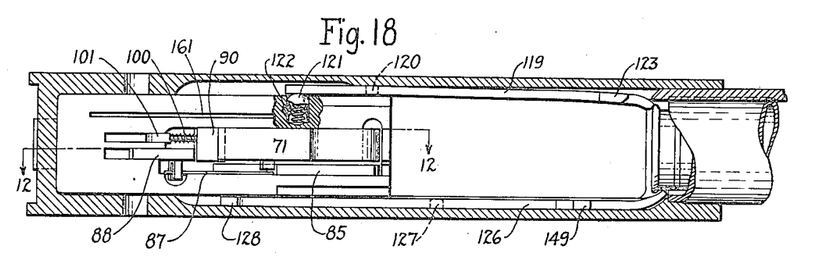
Fig. 18 is a longitudinal section of the receiver taken along the line 18—18 of Fig. 11. This view shows the improved cartridge stop and cartridge cut-off mechanism, as well as certain parts of the firing mechanism housed within the trigger plate.

Referring back to the hammer engaging sear 90 in Figs. 11 and 18, spring 100, guided by pivoted plunger 101, engages sear 90 to urge the latter forward to hammer engaging position. The plunger 101 is seen to ride in a socket in the sear 90, the end of the plunger being spaced from the bottom of the socket in the hammer engaging position of the sear, but being engageable with the bottom of the socket to limit the rearward movement of the sear.

If desired, in order to prevent unnecessary looseness of the trigger 80 about its pivot, a light compression spring 164 may be interposed between the trigger member 80 and the trigger plate, to the rear of pivot 81, to urge the trigger member upward to bear against foot 94 of the hammer sear 90 (Fig. 11). This spring should be lighter to impart less pressure than spring 100 which bears against the sear 90 in order that spring 100 may be predominant and urge the sear to hammer engaging position. A socket may be provided in the trigger member as indicated in Fig. 11, and as more fully disclosed in my copending application, Serial No. 135,582.

*Carrier mechanism*

As a means for raising cartridges from the magazine tube to the breech, a carrier is provided, similar in general aspects to the carrier of my aforementioned Patent No. 1,763,714. The carrier of the present invention consists of arms 106 pivotally mounted on the sides of the receiver at 105 and connected at their forward ends by platform 107. These arms are positioned one to each side of the breech block so that the latter passes between them. The carrier arms are mounted above the slide 61, the lower surfaces of the arms bearing against portions on the upper surface of the slide. In the position shown in Fig. 11 the forward portion 135 of the slide 61 being somewhat wedge shaped is seen to have assumed a position above and bearing against the platform 107, thus securely locking the slide from movement in the breech closing position. This is to provide for a clear opening for loading the magazine tube with cartridges, the lower surfaces of the slide and platform providing a guide surface for the insertion of cartridges into the tube. Upon rearward movement of the slide when the latter reaches the cam projection 112 on the left carrier arm the carrier will be raised slightly until the slide has passed this cam projection 112. From this position of the slide further rearward movement of the same will allow downward movement of the carrier. In order to urge the carrier downward, bent wire springs 108 mounted in the receiver wall and bearing downward against the carrier arms, slidably engaging the same, may be provided. Reliance need not be placed upon the springs 108 to carry the arms downward, however, inasmuch as in the preferred construction a positive means is provided for forcing the carrier arms down. This means consists in the projection 110 provided on extractor claw 111 (Fig. 14) which is mounted on and carried by the breech block. Near the end of the rearward movement of the breech block, projection 110 will engage cam surface 109 on the left carrier arm to positively urge the same downward and also hold the arm in its lowered position. The slide and breech block are now in their rearmost positions, and the carrier in its lowermost position ready to raise another cartridge upward to loading position. On forward movement of the slide the latter will now engage cam surface 99 to raise the carrier to a position where the cam projection 112 of the carrier will bear on the slide. In order that the carrier may be lowered slightly to clear the breech opening for advance of the breech block thereto, the slide will pass projection 112 and allow the carrier to be lowered slightly to the position of Fig. 11 by a wedging action of the forward portion of the slide against the platform 107. Further forward movement of the slide and breech block will then lock the carrier in a position as shown in Fig. 11. Tip 147 (Fig. 14) on the carrier platform entering beveled depression 148 (Fig. 19) of the slide, assists in guiding the slide over the carrier platform. Said tip 147 also acts to support the forward end of a shell which is placed in the receiver with its rear end elevated against the breech block, thus insuring that under no circumstance can a shell fall out of the bottom of the receiver, or assume a position from which it cannot be fed into the chamber.

As before explained, the carrier arms are pivotally mounted at 105 to the side walls of the receiver. These arms are held to the pivots 105 by small projections 1150 as shown in Fig. 11. Recesses 151 are provided in the carrier arms to coincide with projections 1150 in a certain position of the carrier arms to permit release of the same from the pivots 105. This position will be seen to be when the carrier arms extend in a vertically downward position, as viewed in Fig. 11. The utility of this construction will be more fully explained hereinafter.

Ejecting mechanism

Figure 14:
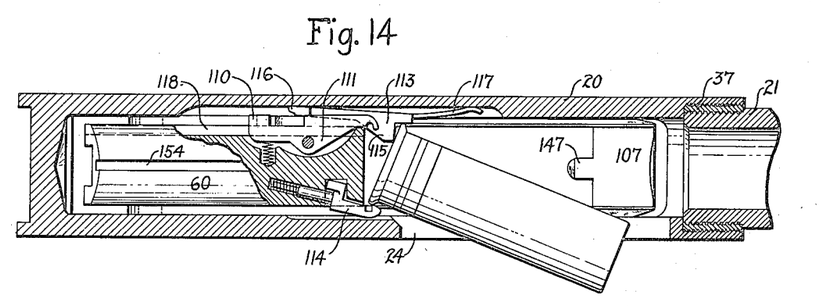
Fig. 14 is a view partly in section, taken from above, of the receiver showing diagrammatically a cartridge shell about to be ejected.

According to the present invention, ejection of the cartridge shell is effected by an ejector member which snaps into the path of the shell in its rearward movement to eject the shell through a port-hole in the side of the receiver. In Fig. 14 a shell is shown just at the moment of ejection through the port hole 24 in the side of the receiver. In the forward position of the breech-block, the spring-urged extractor 114 and claw 111 snap into engagement with the rim of the cartridge shell in a manner well known. After firing, on retraction of the breech-block, the shell is drawn rearward by extractor 114 and claw 111. An ejector comprising a longitudinally and vertically disposed body 113 and a transversely extending head 115 adapted to engage the shell to eject the same, is positioned in a vertical cut in the left side wall of the receiver near the upper portion thereof. The portion 116 of ejector 113 is mounted in a vertical slot in the receiver wall for pivotal movement therein (Figs. 14 and 16). Thus is effected a simplified and dependable mounting for the ejector member. A suitable spring such as wire 117 urges the ejector 113 away from the recess and into a shell ejecting position. As the breech-block is moved forward, the head 115 of the ejector 113 rides in a groove 118 in the breech-block, shown in Fig. 14, against the compression of spring wire 117. In the forward position of the breech-block it will have passed beyond the ejector, but in this position left carrier arm 106 will be in the raised position shown in Fig. 11, and bearing against the side of the ejector body, will hold the same in its recess in the receiver wall until the breech-block is again retracted to engage head 115 of the ejector in the groove 118. In operation, the fired shell, being carried to the rear by movement of the breech-block, will strike the ejector head, which snaps outwardly under the force of its spring as the breech block passes to the position of Fig. 14, and thus the shell will be ejected through the side port hole.

The rotation of the shell toward the ejection port is facilitated by a sharp rearward movement of the breech block which occurs just as the shell is being freed from the breech block. Referring to Fig. 14, it will be noted that the rearward edge of the ejector head 115 is inclined in such a manner as to have a camming engagement with the breech block at the end of the slot 118. The breech block is drawn rearwardly by the action bar and fore-end until the forward end of said cam surface clears the forward end of the breech block; thereupon, due to the engagement of said cam surface with the breech block adjacent the end of the slot 118, the breech block is snapped back a short distance by the power of the ejector spring 117. The edge of the shell adjacent the loading port is at this time in contact with the extractor 114, as illustrated in Fig. 14; thus, the sharp rearward movement of the breech block relative to the ejector head 115 turns the shell forcefully toward the ejection port. The extent of this auxiliary movement of the breech block is of course limited by the clearance between the breech block foot 67 and the notch in the action slide which receives said foot plus the clearance between the action bar head 132 and the notch 131 in the action slide which receives said head.

As illustrated in Figs. 11 and 22, the ejector body 113 is provided at its forward end with a downward extension 1131 which, when the breech block is retracted, acts in conjunction with the front face 701 of the trigger plate to stop the rearward movement of a shell or cartridge which is being released from the magazine in the manner to be presently described, thereby preventing such shell from moving rearwardly to a position in which the ejector head 115 would obstruct its upward movement by the carrier.

Cartridge stop mechanism

Figure 21:
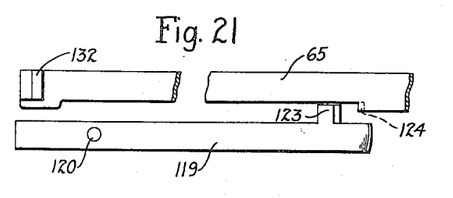
Fig. 21 is a detail, as viewed from the side, of the action bar showing its relation to the cartridge cut-off.

In Fig. 18 is shown, on the left hand side of the receiver wall, a cartridge stop 119. This cartridge stop is loosely mounted on an inwardly projecting pin 120. The stop is loosely mounted on said pin to permit a lateral pivotal movement of the stop in the receiver. In the position shown in Fig. 18 the spring pressed cap 121, mounted in the side of the trigger plate and pressing against the rear end of the cartridge stop, urges the forward end of the stop into engagement with the rearmost shell of the magazine tube. The spring pressed cap is retained in position in the trigger plate by retaining pin 122 mounted in an elongated groove in the side of the cap. At the forward end of the cartridge stop there projects upwardly a cam lug 123 adapted to be engaged by cam surface 124 on the action slide arm 65 near the end of rearward movement of the slide (Fig. 21), in order to cam the cartridge stop 119 away from cartridge engaging position to allow the cartridge to be projected by magazine spring 55 into the receiver to a position on the carrier platform which would then be in its lowermost position.

At the opposite side of the receiver from the cartridge stop 119 is positioned a cut-off member 126. This cut-off member is mounted on horizontal pivot 127 for vertical movement. The slide, during its rearward movement, engages projection 128 of the cut-off member to raise the latter into a position, as shown in Fig. 18, to stop the next following cartridge from being projected from the magazine tube, after the disengagement of stop 119 from the rearmost cartridge. Near the end of its forward movement, the slide engages a lug 149 on the cut-off member 126 to cam the same downward out of engaging position with the next following cartridge, which cartridge then moves rearward slightly to engage stop member 119, which is sprung back into shell engaging position by the release of lug 123 from the action bar.

It will be noted that in the improved firearm of this application both the cartridge cut-off member 126 and the cartridge stop member 119 are mounted on horizontal pivots through apertures in these members. The pivotal movement of each, however, is different from the other, the movement of the stop member 119 being lateral about the pivot 120, and the movement of cut-off member 126 being vertical about pivot 127. This construction makes for simplicity and facilitates assembly and disassembly.

Receiver construction

Figure 19:
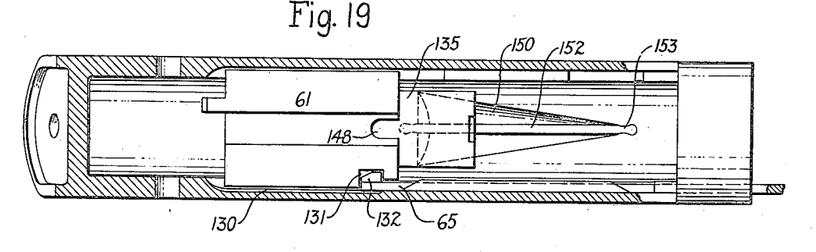
Fig. 19 is a view of the receiver, partly in section, as seen from below. In this view are shown the action slide and the connection of the action bar to the slide.
Figure 20:
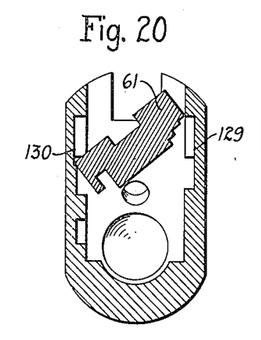
Fig. 20 is an inverted transverse section of the receiver, taken at a point indicated by the line 20—20 of Fig. 15. In this view is shown diagrammatically the slide in a position for removal from the receiver.

As before stated, one of the objects of the present invention is to make a firearm in which assembly and disassembly of parts may be performed with ease and without the necessity of tools. All the mechanism housed within the receiver in the present invention may be easily removed from the receiver after the simple expedient of removing transverse pin 72. This pin is held in place by a resilient means positioned in slot 161 of the trigger plate engaging a groove in the pin (not shown), and may be easily removed by pressure from one side. On removing the pin, the trigger plate 70 and the firing mechanism housed therein may be moved forward slightly and then lifted out of the L-shaped recesses 73 and the recess which houses projection 74, leaving the mechanism then remaining in the receiver exposed for removal through the bottom opening. The cartridge cut-off member 126 and cartridge stop member 119 may be easily detached from their pivot pins, leaving exposed slide 61 and breech-block 60, as well as action slide bar 65, shown in Fig. 17. With the receiver inverted, as illustrated in Figs. 19 and 20, the action slide 61 may be readily removed from the receiver. In order to permit this removal, there are provided in the inner walls of the receiver cuts 129 and 130 shown in Figs. 19 and 20. These cuts render it possible to tilt the slide sideways, as illustrated, and thus be removed through the bottom aperture of the receiver. During this removal operation of the slide the latter will be disengaged from action bar 65 at notch 131 in which the slide is engaged by projection 132 of the action bar (Fig. 19.) The breech-block 60 may be then easily removed from the receiver. The only parts now remaining in the receiver are the ejector member 113, which may be readily detached from the notch in the side wall of the receiver, and the carrier member. As before explained, the said carrier member on being rotated to a position vertically downward (Fig. 11) may be readily detached from the pivot pins 105. Thus, all the parts of the receiver may be removed manually through the bottom opening thereof without the use of tools.

The recoil shoulder 64 may be formed in the upper wall of the receiver by a cut from a milling cutter applied with its axis of rotation at an angle to the receiver wall. This will leave a forwardly tapering recess 150, best seen in Figs. 11, 15 and 19. At the longitudinal center of this recess is made another cut 151 (Fig. 15) somewhat longer longitudinally than recess 150. Into cut 151 is inserted bar 152 (Fig. 19), the lower surface of this bar being substantially flush with the upper wall of the receiver. At 153 the adjacent portions of the receiver wall are peened over to secure the bar in place. At the breech closing position of Fig. 11, a channel 154 in the upper rear surface of the breech-block receives bar 152 to stabilize the breech-block laterally in the firing position. In the rearward movement of the breech-block its forward upper surface, being uncut, bears against bar 152 to prevent upward movement of the forward end of the breech-block. The bar 152 serves also as a guide for cartridges in the extraction and loading operations to prevent fouling.

Fig. 15 shows the several cuts, recesses and channels provided in the left side of the receiver wall for the reception of parts housed in the receiver. Cut 130, as previously explained, permits the removal of the slide from the receiver. Slide 61 is adapted to reciprocate fore and aft in channel 155. This channel 155 on the left-hand side of the receiver also guides action bar 65 (Fig. 19) in its reciprocating movement. The cut 156 is provided to receive cartridge stop 119 adapted for a loose mounting on pin 120, as previously explained. The opening at 157 receives lug 123 of the stop, allowing engagement of the lug with the action bar at 124 (Fig. 21), previously explained. Recess 158 is provided for the ejector member 113, transverse slot 159 receiving the pivot portion 116 and the groove 160 forming a seat for spring wire 117. The L-shaped slot for attachment of the trigger plate is shown at 73.

It will be understood that the embodiments of my invention herein shown and described are purely illustrative, and that various changes in construction may be made without departing from the spirit of the invention as hereinafter claimed.

What I claim is:

1. In a firearm, the combination of a receiver, a breech block, an action slide carrying said breech block, a member movable to lock said slide, a hammer, a spring follower for actuating said hammer, and means carried by said follower cooperating with said slide locking member for actuation of said member.

2. In a firearm, the combination of a receiver, a breech block, a carrier, an action slide movable to actuate said breech block and carrier, a member movable to lock said slide, a hammer, a spring follower for actuating said hammer, and a spring means carried by said follower cooperating with said slide locking member for actuation of said member.

3. In a firearm, the combination of a receiver, a breech block, a carrier, a slide for actuating said breech block and carrier, a pivoted member movable to positions for locking and unlocking said slide, and a member engageable with said pivoted locking member at either side of its pivot to hold the locking member in either its locking or unlocking position.

4. In a firearm, the combination of a receiver, a breech block, a carrier, a slide for actuating said breech block and carrier, a pivoted member movable to positions for locking and unlocking said slide, a hammer and a hammer spring for actuating said hammer, and a member actuated on movement of said hammer spring, bearing against said locking member and slidable from one side of the pivot of the locking member to the other to move the locking member from one of said positions to the other.

5. In a firearm, the combination of a receiver, a breech block, a carrier, a slide for actuating said breech block and carrier, a pivoted locking member for said slide, a hammer, a follower for actuating said hammer, a spring member secured at one end to said follower the other end bearing against the slide locking member and movable to engage the locking member at either side of its pivot, engagement on one side of said pivot effecting a locking of said slide by said locking member, and engagement on the other side of said pivot effecting an unlocking of the same.

6. In a firearm, a receiver, a barrel, a magazine tube, openings in said receiver to accommodate said barrel and tube, a barrel locking key, a tube locking key, and a member engaging said receiver and both of said keys to hold said keys in engagement with the receiver.

7. In a firearm, a receiver, a barrel, a magazine tube, openings in said receiver to accommodate said barrel and tube, a bushing interposed between said barrel and receiver opening, a locking key engaging said bushing and receiver, a locking key engaging said tube and receiver, and means for securing said keys to the receiver.

8. In a firearm, the combination of a receiver, a magazine tube rigidly attached to said receiver and a barrel detachably secured to said receiver, a take-down mechanism consisting of an attaching means on said barrel, an apertured plug carried by said magazine tube, means movable in said plug aperture engageable with said plug and barrel attaching means to detachably secure the barrel to the magazine tube.

9. In a firearm, the combination of a receiver, a magazine tube rigidly attached to said receiver and a barrel detachably secured to said receiver, a take-down mechanism consisting of an attaching means on said barrel, an apertured plug carried by said magazine tube, means movable in said plug aperture engageable with said plug and barrel attaching means to detachably secure the barrel to the magazine tube, a barrel supporting yoke mounted on said magazine tube, an assembly pin constituting the sole means for securing said yoke and plug to said magazine tube.

10. In a firearm, the combination of a receiver, a magazine tube rigidly attached to said receiver and a barrel detachably secured to said receiver, means for detachably securing the barrel to the magazine tube including a barrel attaching means, a member carried by said magazine tube movable in translation to engage said barrel attaching means but restrained from rotation, and means to actuate said member.

11. In a firearm, the combination of a receiver, a magazine tube rigidly attached to said receiver and a barrel detachably secured to said receiver, means for detachably securing the barrel to the magazine tube including a barrel attaching means, a member engageable with said barrel attaching means movable in translation but restrained from rotation, and a rotatable member carried by said magazine tube for actuating said engaging member.

12. In a firearm, the combination of a receiver, a magazine tube rigidly attached to said receiver, a barrel detachably secured to said receiver, means for detachably securing the barrel to the magazine tube including a barrel attaching means, a member engageable with said barrel attaching means movable in translation but restrained from rotation, and a rotatable member carried by said magazine tube for actuating said engaging member, said rotatable member being restrained from translation.

13. In a firearm, in combination with a receiver, a magazine tube rigidly attached to said receiver and a barrel detachably secured to said receiver, means for detachably securing the barrel to the magazine tube including a barrel attaching means, a member carried by said tube movable in translation to engage said barrel attaching means, a barrel yoke carried by said tube, and an assembly pin, said yoke, tube and member being apertured to accommodate said pin.

14. In a firearm, in combination with a receiver, a magazine tube rigidly attached to said receiver and a barrel detachably secured to said receiver, means for detachably securing the barrel to the magazine tube including a barrel attaching means, a plug secured in the end of the magazine tube, a member carried by said plug movable to engage said barrel attaching means, said plug being apertured to house said member, and means to prevent unintentional removal of said member from said plug aperture.

15. In a firearm, in combination with a receiver, a magazine tube rigidly attached to said receiver and a barrel detachably secured to said receiver, means for detachably securing the barrel to the magazine tube including a barrel attaching means, an internal sleeve secured in the end of said tube and partially closing the end thereof, a nut seating in the forward end of said sleeve, means engaging said sleeve and nut to allow rotation and prevent translation of said nut, a plug threadedly engaging said nut and movable to engage said barrel attaching means, a barrel supporting yoke carried by said tube, an assembly pin, said yoke, tube, sleeve and plug being apertured to accommodate said pin, means carried by said plug engageable with said barrel attaching means to limit rotative movement of the barrel, and a magazine spring seating against a portion of said internal sleeve.

16. In a firearm, in combination with a receiver, a magazine tube rigidly attached to said receiver and a barrel detachably secured to said receiver, means for detachably securing the barrel to the magazine tube including a barrel attaching means, an internal sleeve secured in the end of said tube and partially closing the end thereof, a nut seating in the forward end of said sleeve, means engaging said sleeve and nut to allow rotation and prevent translation of said nut, a travelling sleeve threadedly engaging said nut and movable to engage said barrel attaching means, a guide plug supporting said travelling sleeve, a barrel supporting yoke carried by said tube, an assembly pin, said yoke, tube, sleeve, travelling sleeve and plug being apertured to accommodate said pin, means carried by said travelling sleeve engageable with said barrel attaching means to limit rotative movement of the barrel, and a magazine spring seating against a portion of said internal sleeve.

17. In a firearm, in combination, a receiver, a magazine tube and a barrel secured to said receiver, a reciprocating slide in said receiver, means for actuating said slide, a breech block carried by said slide, an extractor claw carried by the breech block, a carrier having arms pivoted in the sides of said receiver, means on said carrier arms cooperating with said slide to actuate the carrier, and means on said carrier arms cooperating with said extractor claw to actuate said carrier.

18. In a firearm, in combination, a receiver, a reciprocating action slide, a movable breech block carried by said slide, longitudinal channels in said receiver to guide said slide, a reciprocating action bar to actuate said slide, a connection between said bar and said slide comprising a lug on said bar, a vertical slot in the side of said slide adjacent said bar whereby said slide may be disengaged from said bar by relative vertical displacement of said bar and slide without relative lateral displacement.

19. In a firearm, in combination, a receiver housing having side walls, longitudinal guide channels in said side walls, an opening in the bottom of said housing, an action slide movable in said guide channels, the walls of said housing being recessed at a point opposite said opening adjacent said guide channels to permit tilting of the slide for removal of the slide through the said bottom opening.

20. In a firearm comprising a receiver, a shell ejection port in said receiver, a breech block movable in said receiver and means for holding a shell upon said breech block; in combination, a spring-urged ejector device adapted to eject a shell held on said breech block through said ejection port, said ejector device comprising a cam adapted for cooperation with said breech block, whereby said breech block is snapped rearwardly by said ejector spring at the moment of shell ejection.

21. In a firearm comprising a receiver, a cartridge carrier in said receiver, a cartridge storing magazine, means for delivering a cartridge from said magazine onto said carrier, a trigger plate held in said receiver, and a shell ejecting device mounted in said receiver; in combination, means for stopping the rearward movement of a cartridge delivered from said magazine onto said carrier comprising an upwardly extending part on said trigger plate and a depending part on said ejector.

22. In a firearm comprising a receiver provided with an ejection port, a cartridge carrier in said receiver, a cartridge storing magazine, and means for delivering a cartridge from said magazine onto said carrier; in combination, an ejector device mounted in said carrier and comprising a laterally extending cartridge engaging head and a downwardly extending portion adapted to prevent movement of a cartridge delivered from said magazine onto said carrier beneath said cartridge engaging head.

23. In a firearm comprising a receiver, a cartridge carrier in said receiver, a cartridge storing magazine, means for delivering a cartridge from said magazine onto said carrier, and a trigger plate held in said receiver; in combination, a shell ejecting device mounted in said receiver and comprising a laterally extending shell engaging head, and means for preventing the movement of a cartridge delivered from said magazine onto said carrier beneath said shell engaging head comprising cooperating parts on said ejecting device and said trigger plate.

24. In a firearm comprising a receiver, a trigger plate and a hammer pivoted in said trigger plate, means for holding said trigger plate in position in said receiver comprising lugs associated with and projecting from said hammer pivot, and recesses in the sides of said receiver adapted to receive said lugs.

25. In a firearm comprising a receiver, a trigger plate and a hammer adapted to be pivoted in said trigger plate, means for assembling and securing said trigger plate in said receiver comprising a two-part pivot for said hammer, each part of said hammer pivot comprising a projecting lug having parallel horizontally disposed faces, longitudinally extending recesses in the sides of said receiver adapted to receive said lugs, vertically extending recesses communicating with said longitudinally extending recesses, and an opening at the bottom of said receiver whereby said trigger plate may be removed from said receiver by bringing said lugs opposite said vertically extending recesses.

26. In a firearm comprising a receiver provided with an ejection port, a breech block and means for holding a fired shell in contact with said breech block; an ejector device for ejecting a shell thus held on the breech block through said ejection port comprising an ejector body, a recess in the wall of said receiver adapted to contain said ejector body, a pivot for said ejector comprising an end portion of said body suitably curved and of reduced thickness, and an under-cut in said receiver recess adapted to receive said end portion of said ejector.

CRAWFORD C. LOOMIS.